(12) United States Patent
Murphy et al.

(10) Patent No.: US 7,917,675 B2
(45) Date of Patent: Mar. 29, 2011

(54) METHOD AND APPARATUS FOR INTERCONNECTING MODULES

(75) Inventors: Kenneth John Murphy, Henderson, NV (US); Linda Murphy, legal representative, Henderson, NV (US); Thomas Bruce Meagher, Houston, TX (US); Philip John Agar, Danbury (GB); Ian David Wynne Jones, West Mersea (GB); Gerald Robert Creech, Danbury (GB)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 66 days.

(21) Appl. No.: 12/361,603

(22) Filed: Jan. 29, 2009

(65) Prior Publication Data

US 2009/0198348 A1 Aug. 6, 2009

Related U.S. Application Data

(60) Provisional application No. 61/025,501, filed on Feb. 1, 2008.

(30) Foreign Application Priority Data

Sep. 26, 2008 (GB) .................................. 08165262

(51) Int. Cl.
*G06F 13/00* (2006.01)
*G06F 11/00* (2006.01)
*H04L 12/28* (2006.01)
(52) U.S. Cl. ........ 710/100; 710/107; 710/301; 710/302; 714/11; 714/12; 714/51; 370/229; 370/352; 370/406

(58) Field of Classification Search .................. 710/100, 710/301, 302; 714/11, 12; 370/406
See application file for complete search history.

(56) References Cited

U.S. PATENT DOCUMENTS

| 5,339,404 | A | 8/1994 | Vandling, III |
| 6,430,634 | B1* | 8/2002 | Mito ............................. 710/100 |
| 6,611,526 | B1* | 8/2003 | Chinnaswamy et al. ..... 370/406 |
| 6,757,756 | B1* | 6/2004 | Lanteigne et al. ............. 710/52 |

(Continued)

FOREIGN PATENT DOCUMENTS

WO    WO 01/86454    11/2001

(Continued)

OTHER PUBLICATIONS

"en.wikipedia.org/wiki/High-Level_Data_Link_Control"—High-Level Data Link Control; Obtained Jun. 30, 2010, 11 pages.*

(Continued)

*Primary Examiner* — Brian T Misiura
(74) *Attorney, Agent, or Firm* — Boyle Fredrickson LLP; William R. Walbrun; John M. Miller

(57) ABSTRACT

An industrial process control apparatus and method that includes a number of processors and a number of input/output modules. Each processor is connected to a plurality of the input/output modules by a unidirectional command line. Each input/output module is connected to a plurality of the processors by a unidirectional response line. The processors are arranged to issue an identifier request to all of the connected input/output modules and each input/output module is arranged to respond to the identifier request via the respective response line with a response that includes a unique identifier. Such a configuration allows each processor to identify the physical location of each respective input/output module.

18 Claims, 8 Drawing Sheets

U.S. PATENT DOCUMENTS

| | | | |
|---|---|---|---|
| 6,928,500 B1 * | 8/2005 | Ramanujan et al. | 710/107 |
| 7,162,666 B2 * | 1/2007 | Bono | 714/51 |
| 7,460,482 B2 * | 12/2008 | Pike | 370/241 |
| 7,577,753 B2 * | 8/2009 | Temoshenko et al. | 709/237 |
| 7,623,444 B2 * | 11/2009 | Ra et al. | 370/220 |
| 7,715,369 B1 * | 5/2010 | Wang et al. | 370/352 |
| 7,719,966 B2 * | 5/2010 | Luft et al. | 370/229 |
| 2007/0220367 A1 * | 9/2007 | Smith et al. | 714/48 |
| 2009/0195256 A1 * | 8/2009 | Meagher et al. | 324/537 |
| 2009/0195952 A1 * | 8/2009 | Meagher | 361/84 |
| 2009/0219049 A1 * | 9/2009 | Meagher et al. | 324/769 |
| 2009/0234469 A1 * | 9/2009 | Meagher | 700/79 |
| 2010/0079129 A1 * | 4/2010 | Meagher | 323/318 |

FOREIGN PATENT DOCUMENTS

| | | |
|---|---|---|
| WO | WO 2006/108281 | 10/2006 |

OTHER PUBLICATIONS

European Search Report.

* cited by examiner

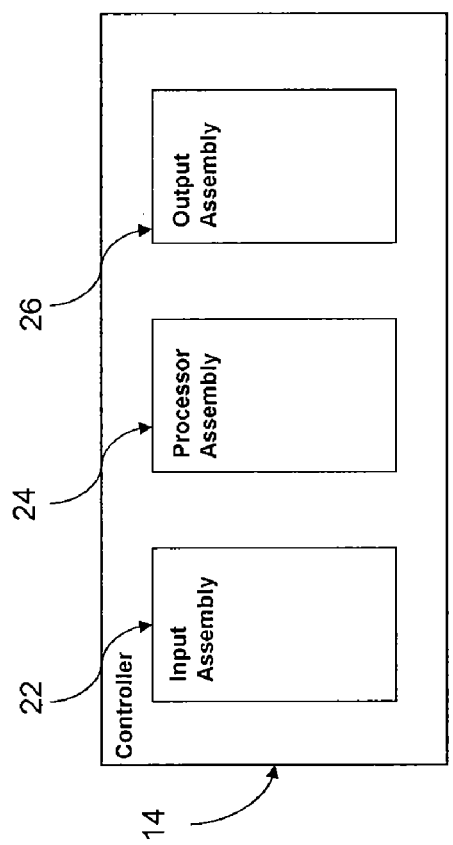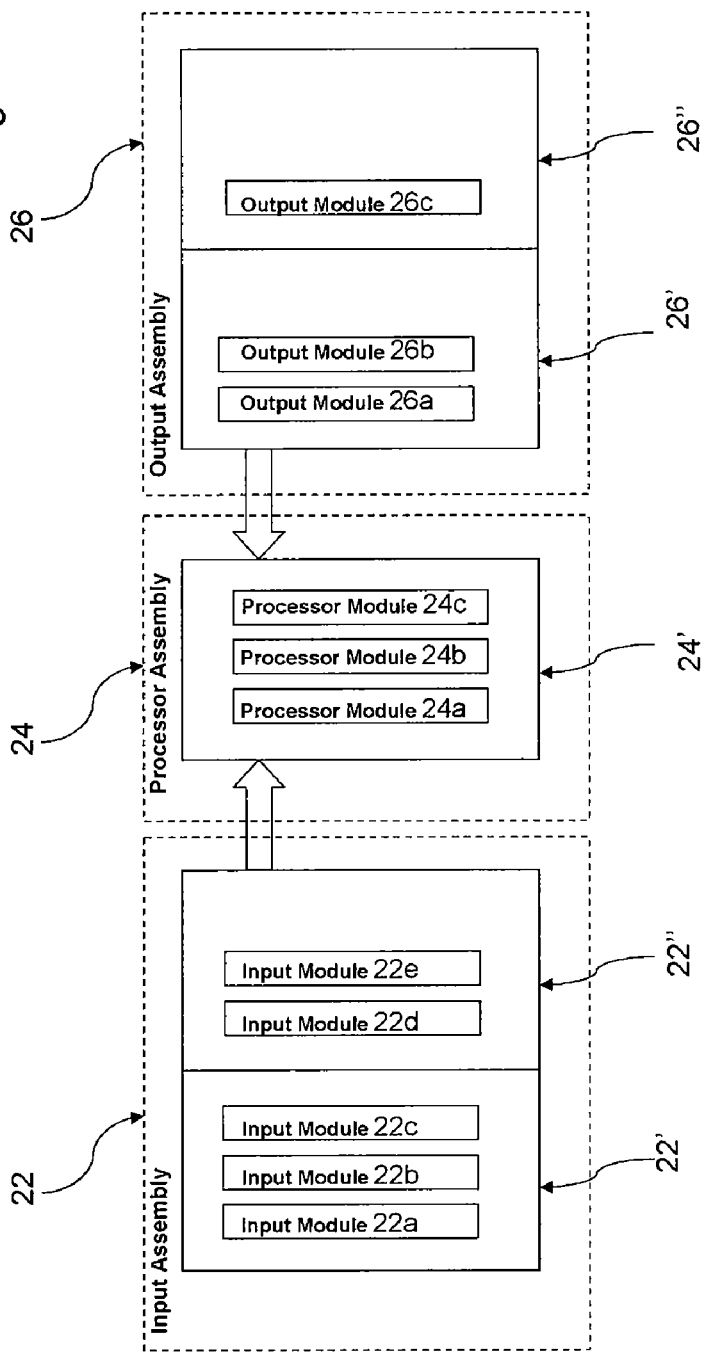

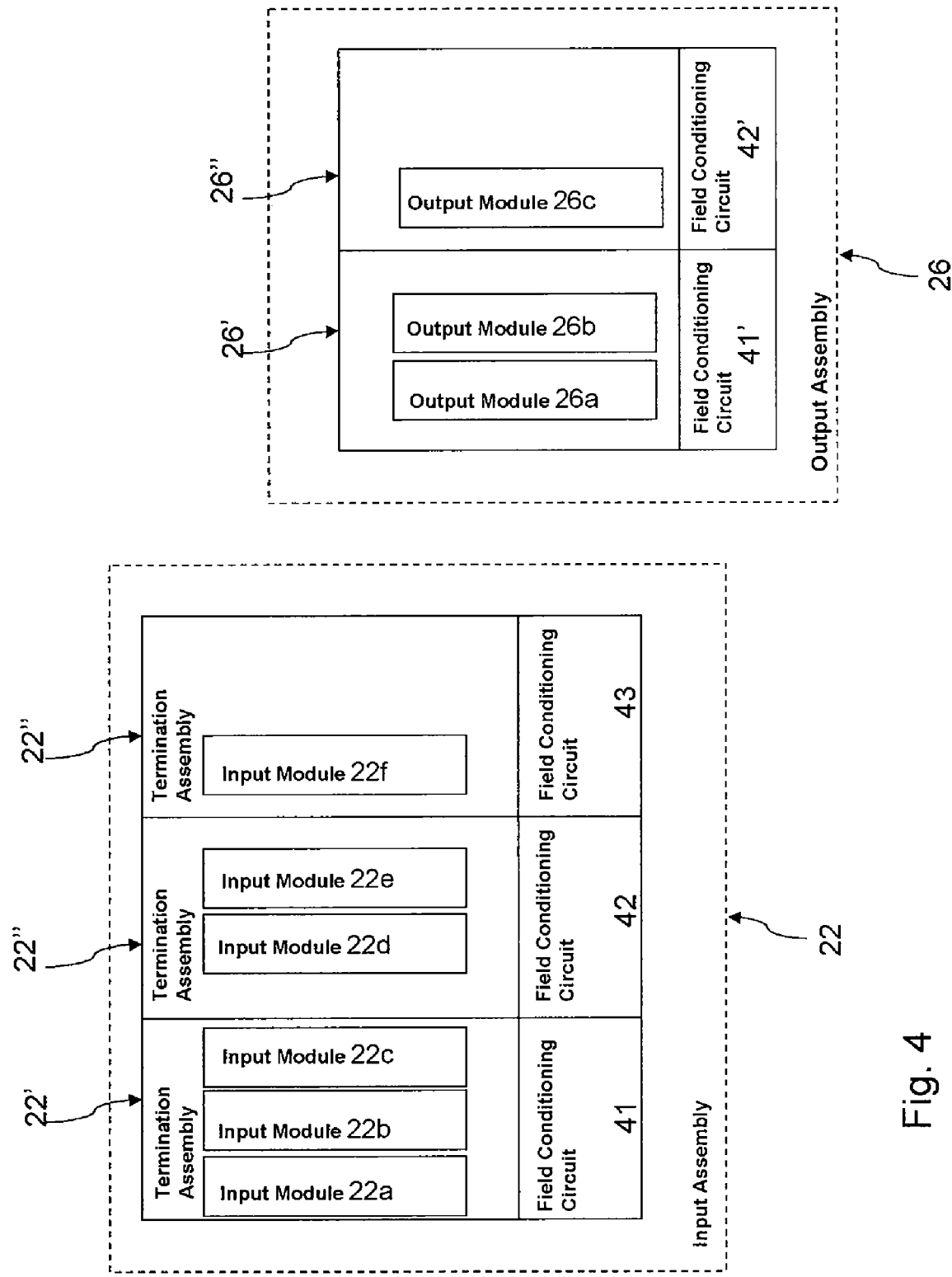

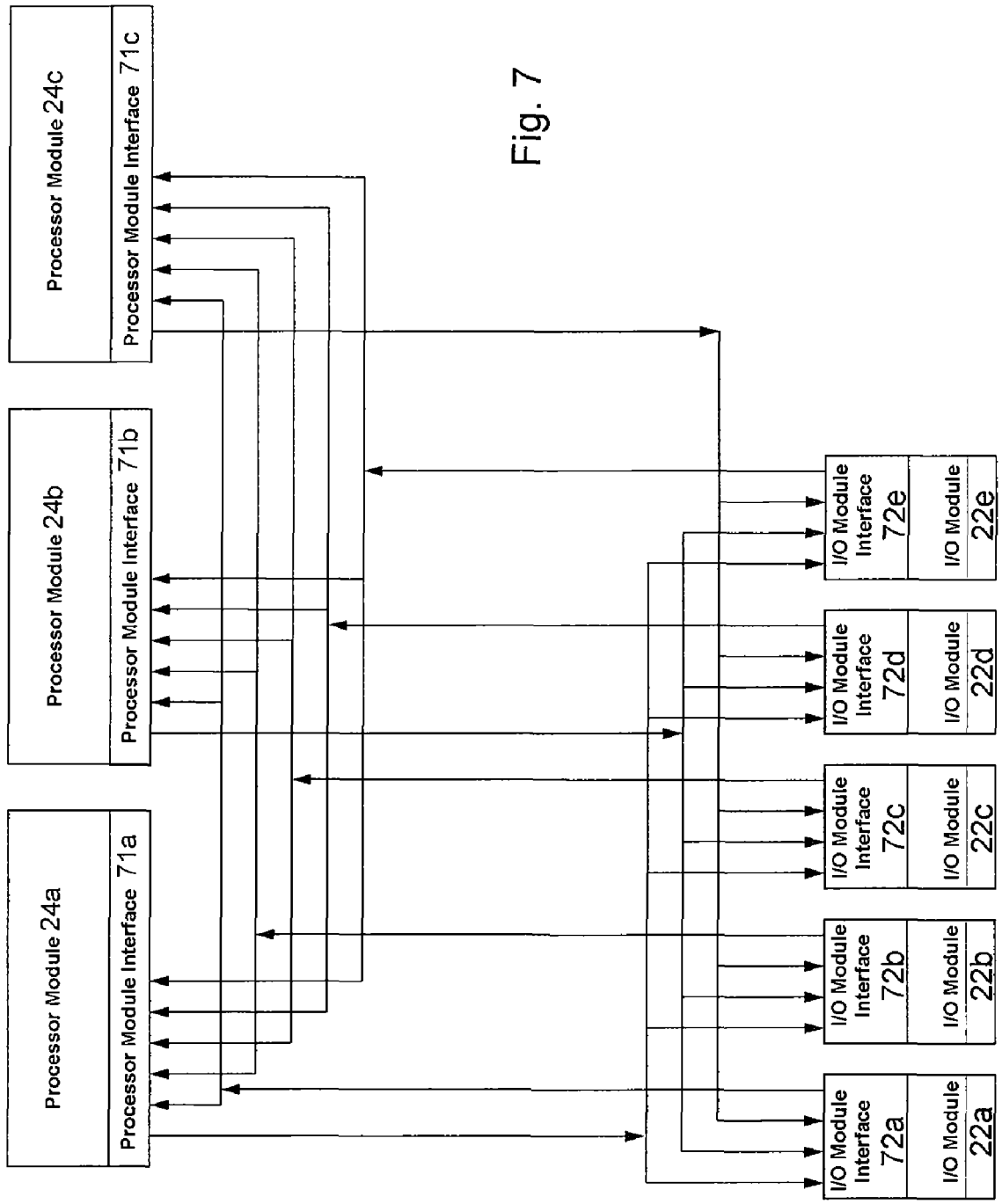

METHOD AND APPARATUS FOR INTERCONNECTING MODULES

CROSS REFERENCE TO RELATED APPLICATIONS

This application claims priority to U.S. Provisional Application Ser. No. 61/025,501 filed on Feb. 1, 2008 and European Patent Application No. EP08165262 filed on Sep. 26, 2008, the disclosures of which are expressly incorporated herein.

BACKGROUND a. Field of the Invention

This invention relates to a method and apparatus for interconnecting modules in an Industrial Process Control System in particular for an Industrial Process Control System suitable for use with exemplary systems such as:

Emergency Shutdown systems;
Critical process control systems;
Fire and Gas detection and protection systems;
Rotating machinery control systems;
Burner management systems;
Boiler and furnace control systems; and
Distributed monitory and control systems.

Such control systems are applicable to many industries including oil and gas production and refining, chemical production and processing, power generation, paper and textile mills and sewage treatment plants.

b. Related Art

In industrial process control systems, fault tolerance is of utmost importance. Fault tolerance is the ability to continue functioning safely in the event of one or more failures within the system. Fault tolerance is usually categorised in accordance with a safety integrity level (SIL) scale where a higher SIL means a better safety performance. SILs are defined in standards IEC 61508 (Functional safety of electrical/electronic/programmable electronic safety-related systems) and specifically for the process industry in IEC 61511 (Functional safety—Safety instrumented systems for the process industry sector).

Fault tolerance may be achieved by a number of different techniques, each with its specific advantages and disadvantages.

An example of a system which provides redundancy is a Triple Modular Redundancy (TMR) system. Using TMR, critical circuits are triplicated and perform identical functions simultaneously and independently. The data output from each of the three circuits is voted in a majority-voting circuit, before affecting the system's outputs. If one of the triplicated circuits fails, its data output is ignored. However, the system continues to output to the process the value (voltage, current level, or discrete output state) that agrees with the majority of the functional circuits. TMR provides continuous, predictable operation of systems equipped in such a manner.

However, TMR systems are expensive to implement if full TMR is not actually a requirement, and it is desirable to utilise an architecture which provides flexibility so that differing levels of fault tolerance can be provided depending upon specified system requirements.

Another approach to fault tolerance is the use of hot-standby modules. This approach provides a level of fault tolerance whereby the standby module maintains system operation in the event of module failure. With this approach there may be some disruption to system operation during the changeover period if the modules are not themselves fault-tolerant.

Fault tolerant systems ideally create a Fault Containment Region (FCR) to ensure that a fault within the FCR boundary does not propagate to the remainder of the system. This enables multiple faults to co-exist on different parts of a system without affecting operation.

Fault tolerant systems generally employ dedicated hardware and software test and diagnostic regimes that provide very fast fault recognition and response times to provide a safer system.

Safety control systems are generally designed to be 'fail-operational/fail-safe'. Fail operational means that when a failure occurs, the system continues to operate: it is in a fail-operational state. The system should continue to operate in this state until the failed module is replaced and the system is returned to a fully operational state.

An example of fail safe operation occurs, for example if, in a TMR system, a failed module is not replaced before a second failure in a parallel circuit occurs, the second failure should cause the TMR system to shut down to a fail-safe state. It is worth noting that a TMR system can still be considered safe, even if the second failure is not failsafe, as long as the first fault is detected and announced, and is itself failsafe.

Therefore, it would be desirable to provide a system and method for interconnecting modules using an interconnection scheme which permits flexible system configuration while maintaining a desired level of system operation redundancy.

SUMMARY OF THE INVENTION

The present invention provides a system and method that overcomes one or more of the problems discussed above. According to one aspect of the invention there is provided an industrial process control apparatus that includes a plurality of processors and a plurality of input/output modules. Each processor has a unidirectional command line that is connected to a plurality of input/output modules. Each input/output module has a unidirectional response line which is connected to a plurality of processors.

Preferably, the plurality of processors are connected together via interprocessor links which may provide point-to-point bidirectional links between each processor and each other processor and/or may provide means for a broadcast signal which is received by each other processor.

Preferably, one or more of the processors are directly connected to a control network and each processor has access to another control network via one of the interprocessor links and another processor.

In a preferred aspect, the processors are arranged in operation to issue an identifier request to all of said input and output modules. Each input and output module is arranged in operation to respond with a response that includes a unique identifier via the response line such that each processor is able to identify the physical location of the input or output module having a particular unique identifier by identifying the response line upon which the response is received.

Preferably, the processor is arranged in operation to assign a logical slot number to each input and output module upon receiving the response and a logical group number to each of a plurality of said input and output modules.

A response from an input or output module may also include a termination adaptor identifier that is dependent upon a termination type and physical location of the respective input or output module within the termination adaptor.

The processors may be arranged in operation to send commands to the input and output modules using low voltage differential encoding on differential command line signal pairs.

Preferably, the differential command line signal pairs have no transmission line termination, such that live system backplane insertion is possible, and preferably, the input output modules are arranged in operation to send responses using single ended signals.

In operation, signals may be sent via the command lines and response lines using HDLC encoded frames of data which have been encoded using a NRZI code. Advantageously, there are a plurality of predetermined data streams which are recognised by a receiver in the processors such that input or output modules include one or more of the following: continuous '1's to indicate that the respective module is absent or un-powered; continuous '0's to indicate that the respective module is powered up but seriously faulted; or continuous 0x7E to indicate that the respective module is functional.

BRIEF DESCRIPTION OF THE DRAWINGS

Embodiments of the invention will now be described, by way of example only, with reference to the accompanying drawings, in which:

FIG. 2 illustrates schematically a controller of the industrial process control system illustrated in FIG. 1;

FIG. 3 illustrates a possible configuration of a controller;

FIG. 4 shows various options for an input assembly and output assembly of FIG. 3;

FIG. 7 is a schematic illustration of interconnections between a plurality of processors and a plurality of input/output modules;

DETAILED DESCRIPTION

Figure 1:
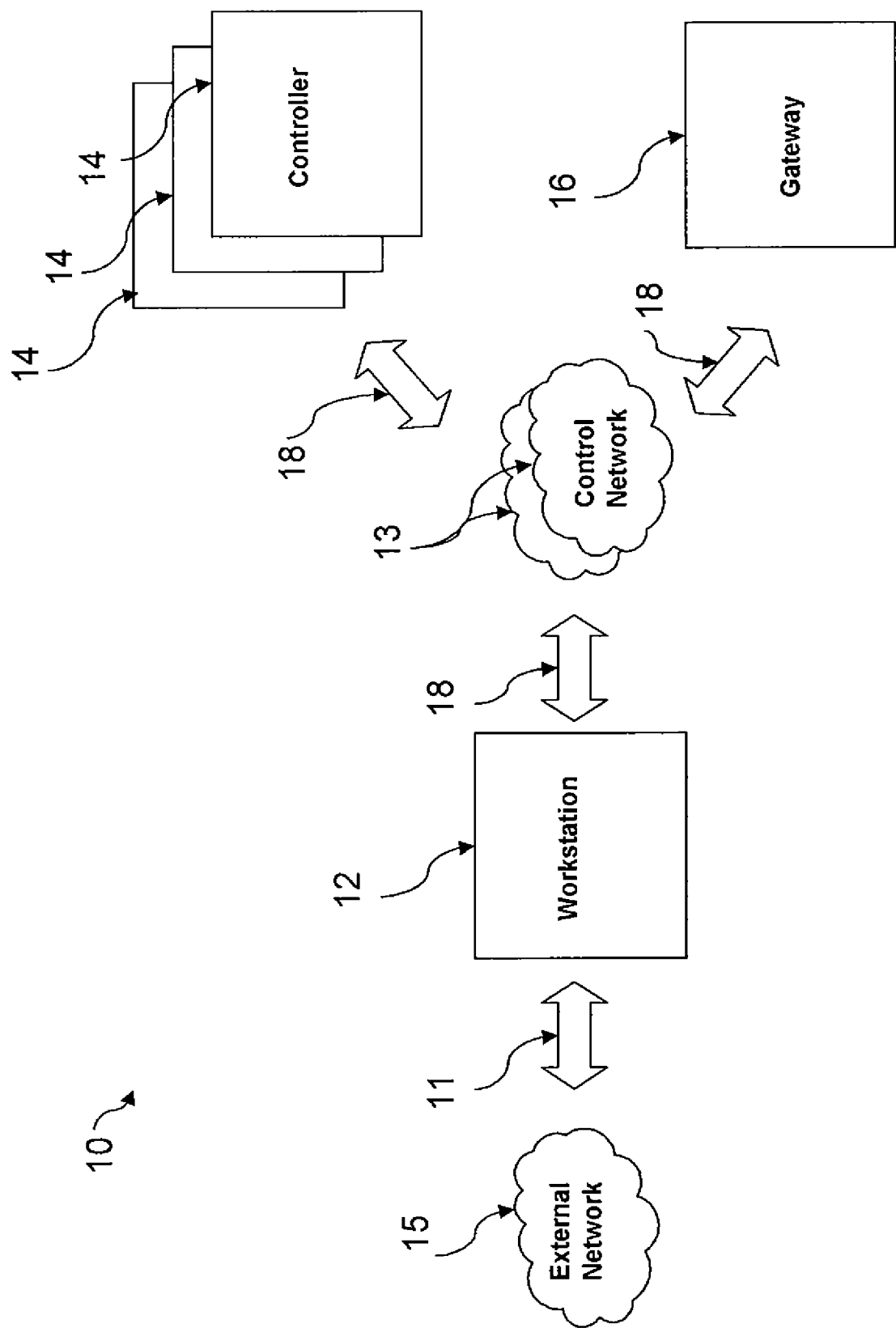
FIG. 1 is an illustration showing the architecture of a distributed industrial process control system which uses the apparatus and method of the present invention.

In the Industrial Process Control System shown in FIG. 1, a distributed architecture is designed to be used in different SIL environments, so that if a high SIL is required it can be provided, but if a low SIL is all that is needed, the system can be reduced in complexity in order to reduce unnecessary extra costs.

An exemplary Industrial Process Control System 10, comprises a workstation 12 one or more controllers 14 and a gateway 16. The workstation 12 communicates with the controllers 14 and the gateway 16 via Ethernet connections 18 to one or more control networks 13. Multiple Ethernet connections 18 provide redundancy to improve fault tolerance. The workstation 12 may be connected via a conventional Ethernet connection 11 to another external network 15.

A controller 14 will now be described in more detail with reference to FIGS. 2 and 3.

FIG. 2 illustrates a schematic diagram of the controller 14 comprising an input assembly 22, a processor assembly 24 and an output assembly 26. In this schematic illustration, the input assembly 24 and output assembly 26 are on different backplanes but they may equally well share a single backplane.

Assemblies 22, 24, 26 are created from one or more communications backplane portions which have three slots to accommodate up to three modules together with termination assemblies which have one two or three slots, and which interface to field sensors and transducers. A termination assembly may straddle two contiguous backplane portions. A module comprises a plug in card with multiple connectors for plugging onto a communications backplane and a termination assembly.

It will be appreciated that having three slots in a communications backplane portion is one design option and other design options with greater (or fewer) slots are possible without departing from the scope of the invention as defined in the appended claims.

FIG. 3 illustrates a possible physical configuration of the controller 14. In this embodiment of the invention, the input assembly 22, output assembly 26 and processor assembly 24 are physically separated from one another by grouping the modules of different types onto separate communications backplanes.

In the example shown, the input assembly 22 comprises two communications backplane portions, 22', 22". The first backplane portion 22' has a triplex input termination assembly and three input modules 22a, 22b, 22c, the second backplane portion 22" has a duplex input termination assembly 22" and two input modules 22d, 22e. The processor assembly 24 comprises a single processor backplane portion 24' having three processor modules 24a, 24b and 24c. The output assembly 26 comprises two backplane portions 26', 26". The first backplane portion 26' has a duplex output termination assembly with two output modules 26a, 26b and the second backplane portion 26" has a simplex output termination assembly with a single output module 26c.

The flexibility of the input assembly 22, will now be described, in more detail with reference to FIG. 4.

An input assembly 22 comprises one or more backplane portions and termination assemblies 22' 22" 22''' etc. For example, a triplex portion 22' having three modules 22a, 22b, 22c might be used for high availability requirement, a duplex portion 22" having two modules 22d, 22e might be provided for fault tolerant applications and a simplex portion 22''' with a single module 22f might be provided for failsafe applications. The termination assemblies may be provided with different types of field conditioning circuits. For example assembly 22' may be provided with a 24V DC field conditioning circuit 41, assembly 22" may be provided with a 120V DC field conditioning circuit 42, and assembly 22''' may be provided with a 4-20 mA field conditioning circuit 43. Similarly possible configurations are shown for an output assembly 26. It will be appreciated that numerous configurations of backplane portions and termination assemblies with various different numbers of modules and various different types of field conditioning circuits are possible and the invention is not limited to those shown in these examples.

Where an assembly provides more than one module for redundancy purposes it is possible to replace a failed module with a replacement module whilst the industrial process control system is operational which is also referred to herein as online replacement (ie replacement is possible without having to perform a system shutdown). Online replacement is not possible for a simplex assembly without interruption to the process. In this case various "hold last state" strategies may be acceptable or a sensor signal may also be routed to a different module somewhere else in the system.

The processor assembly configures a replacement processor module using data from a parallel module before the replacement module becomes active.

The field conditioning circuits 41, 42, 43 transform a signal received from a sensor monitoring industrial process control equipment to a desired voltage range, and distribute the signal to the input modules as required. Each field conditioning circuit 41, 42, 43 is also connected to field power and field return (or ground) which may be independently isolated on a channel by channel basis from all other grounds, depending on the configuration of the input termination assembly. Independent channel isolation is the preferred configuration because it is the most flexible. The field conditioning circuits 41, 42, 43 comprise simple non active parts and are not online replaceable.

Figure 5:
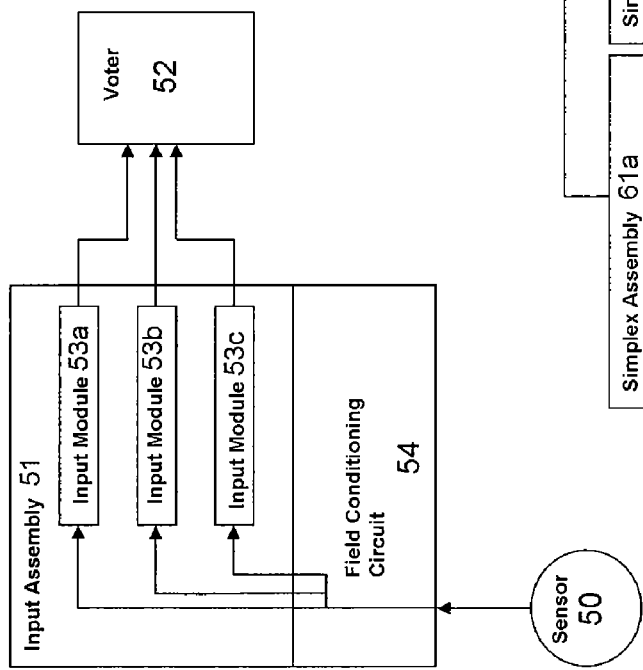
FIG. 5 shows one possible configuration for a two out of three voting strategy of the input assembly.
Figure 6:
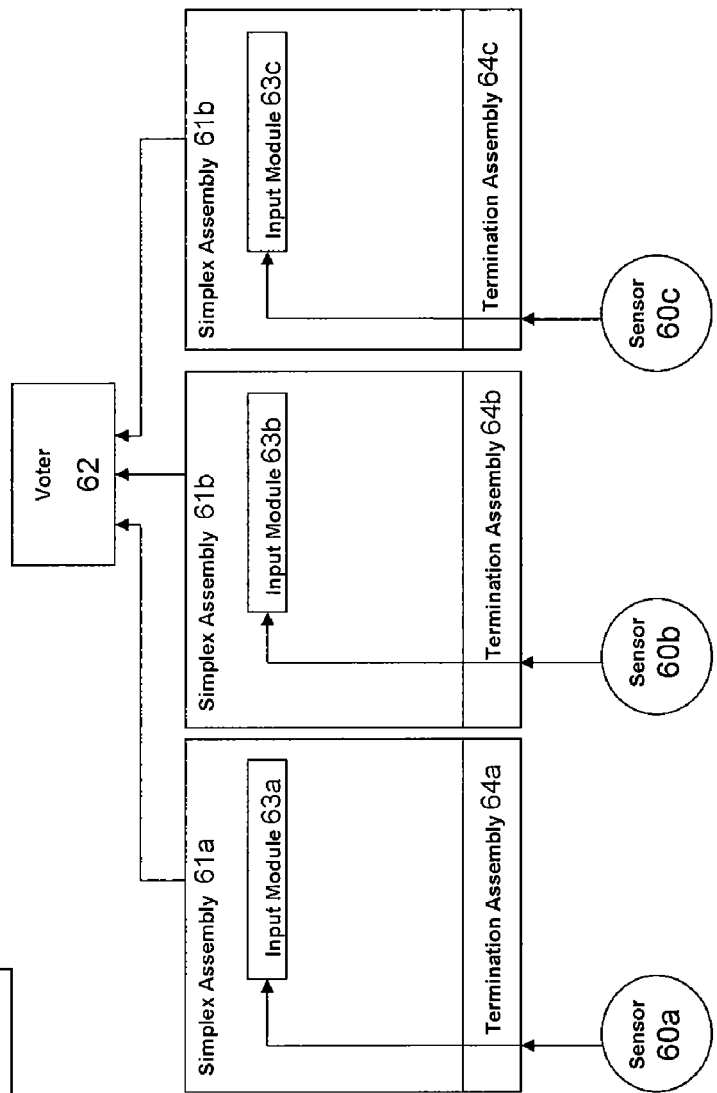
FIG. 6 illustrates a second possible configuration implementing a two out of three voting strategy of the input assembly.

FIG. 5 and FIG. 6 illustrate the flexibility of the architecture described herein showing different configurations for a triplex system for generating a signal with a high availability requirement. Referring to FIG. 5, a three module input assembly 51 receives a signal from a sensor 50 via a field conditioning circuit in termination assembly 54. The field conditioning circuit 54 transforms the signal to a desired voltage range and distributes the signal to three replicated input modules 53a, 53b, 53c. Each input module processes the signal and the results are sent to a two out of three voter 52 to generate a result signal in dependence thereon.

Referring to FIG. 6, replicated sensors 60a, 60b, 60c each send a signal to a respective simplex assemblies 61a, 61b, 61c via respective field conditioning circuits in termination assemblies 64a, 64b, 64c. Each input module 63a, 63b, 63c processes the signal and sends an output to a two out of three voter 62 to generate a signal in dependence thereon. It will be appreciated that many variations and configurations are possible in addition to those illustrated here.

An interconnection scheme for interconnecting an array of one, two, or three processor modules 24a, 24b, 24c to an array of multiple I/O modules, 22a-22e, 26a-26c and to one or more external control networks 13 will now be described with reference to FIGS. 7 to 9.

The interconnection scheme comprises a novel topology which permits flexible system configuration to a desired level of redundancy. In configurations having more than one module per I/O backplane the failure of a processor module 24a-24c or I/O module 22a-22e, 26a-26c does not affect communications links with any of the other elements of the system.

Each processor module 24a-24c possesses a single command output per I/O backplane bus, each of which can accommodate a large number of any type of I/O modules—24 I/O modules per I/O backplane bus in the preferred embodiment of the invention. As an example, a command output is shown in FIG. 7 connected to every I/O module 22a-22e on a daisy chained I/O communications backplane. A further command output is connected to I/O modules 26a-26c on a second daisy chained I/O communications backplane (not shown in the Figure).

Each I/O module 22a-22e, 26a-26c possesses a single response output with its own dedicated wire which is connected to every processor module 24a-24c on a processor I/O communications backplane 24.

This scheme provides three-to-many command busses combined with many-to-three response busses. The busses are unidirectional and as there is only one driver per bus there is no contention. A single fault will only result in communications loss with a single unit.

Figure 8B:
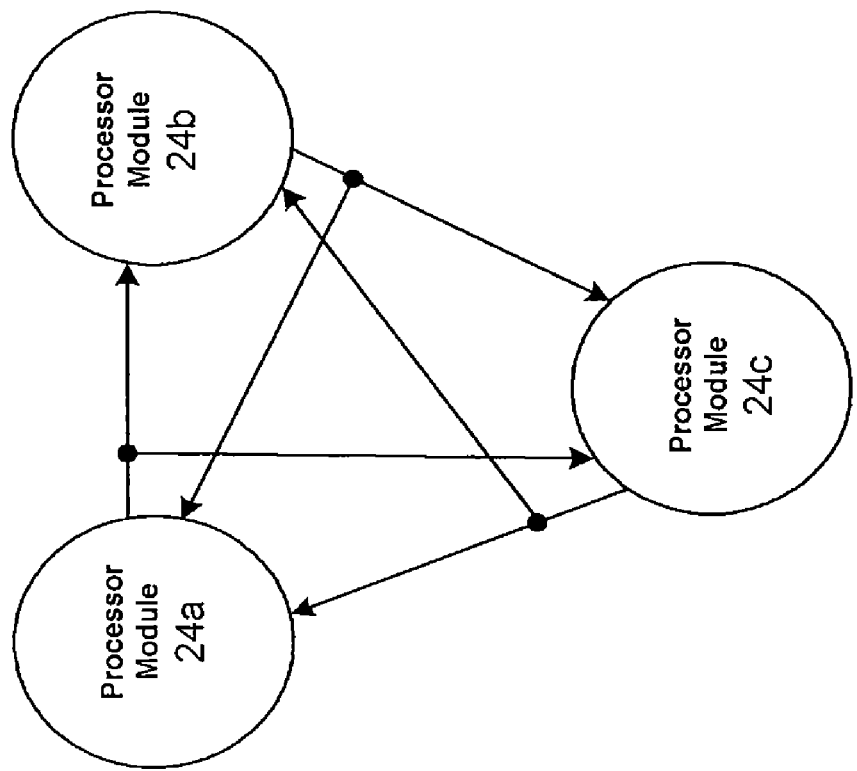
FIGS. 8a and 8b schematically illustrate possible interconnections between a number of processor modules.
Figure 8A:
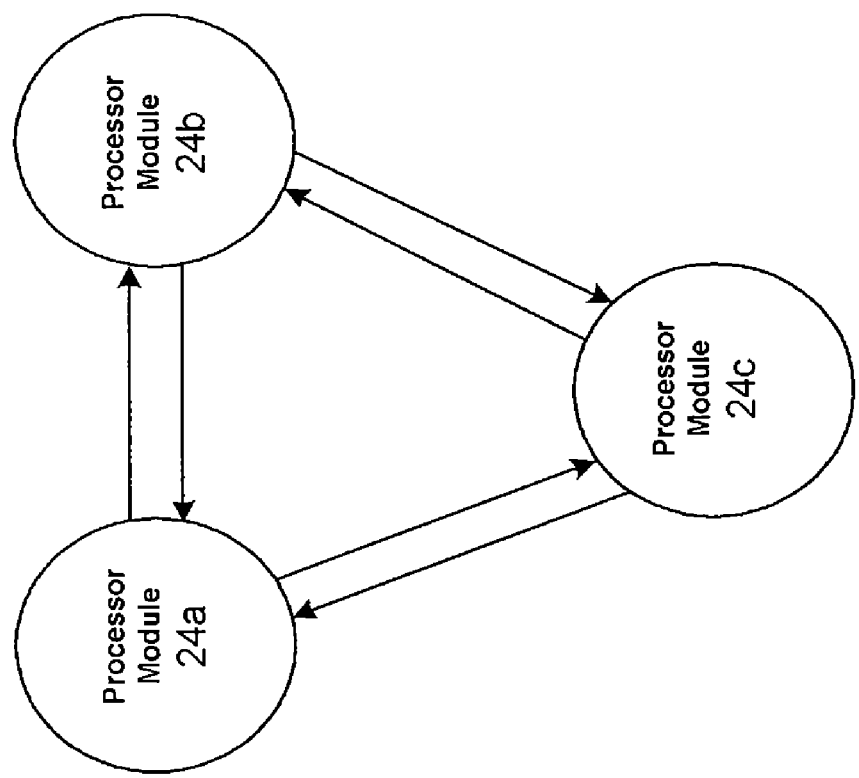

The interconnection scheme also comprises additional dedicated interconnections provided for high speed data links between the three processor slots. There are only two possible topologies to connect three processor nodes, as illustrated in FIG. 8, and both of these Inter-Processor Link (IPL) methods are provided in the preferred embodiment. The first type illustrated in FIG. 8a provides point-to-point bidirectional connections between each processor module and the other two, allowing the use of standard high-speed serial protocols. The second type illustrate in FIG. 8b provides a broadcast style topology whereby each processor module sends an output which is received by the other two. Provision of a combination of point to point bidirectional connections and broadcast style links may be extended to connect more than three processors.

The interconnection scheme also includes external communications channels. Each processor module 24a, 24b, 24c has access to up to two independent control networks 13. When multiple processors are installed, they share their external data network connection with the other installed processors over an inter processor link (IPL) to provide fault tolerant communications facilities.

Each I/O communications backplane assembly comprises a combination of parallel distributed bussed signals for power and command communications busses and also signals that are unique to each input or output module, ie the response lines for communications from each I/O module.

A method whereby the processor modules 24a, 24b, 24c are able to establish the physical configuration of the modules in the system, and how they establish communication with each of the elements that comprise the system will now be described with reference to FIG. 9.

Each I/O Module (IOM) 22a-22e, 26a-26c supplies the processors 24a-24c with a unique identifier (ID1 . . . ID8) when a global request is issued by the processors 24a-24c.

A processor is able to distinguish which physical slot the IOM is resident in by virtue of the line on which it receives the response.

The processors subsequently assigns each IOM a unique logical slot number for subsequent addressing purposes, and also a logical group number, which may be assigned to any number of other IOM's to allow them to be addressed as a single logical unit.

As mentioned previously, each IOM 22a-22e, 26a-26c is connected to the field sensor signals by a Termination Assembly (TA) 41-43, 41'. The TA's are built to distribute field signals between one, two or three IOM's depending on the required redundancy level as described previously. Each slot in each TA is assigned a unique eight bit ID value that is specific to that TA type and slot position within that termination assembly. (TA ID #1 . . . TA ID #N). So, for example, if multiple TA's of the same identical type were employed, then the TA_ID's of these would all be the same as each other, even though they are connected to IOM's with their own unique IOM_ID's and uniquely assigned SLOT_ID's. In combination with the IOM's physical slot position, determined as described previously, the processors 24a-24c are able to determine precisely how the controller 14 is physically laid out, as long as at least one IOM is present in each termination assembly. Therefore it is possible for the processors to determine the redundancy level for each I/O termination assembly 22', 22", 26', 26" (FIG. 2).

Figure 9:
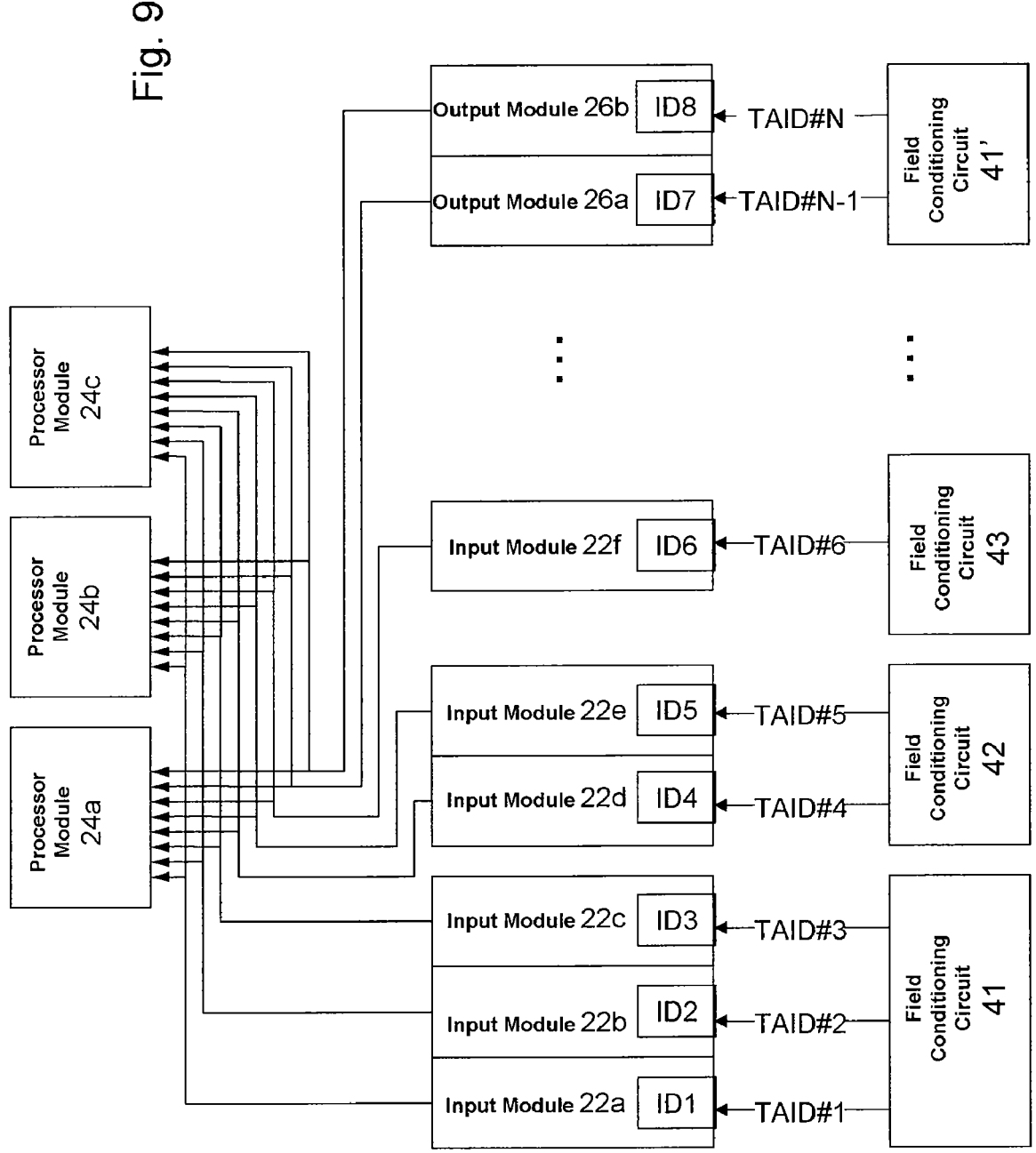
FIG. 9 illustrates use of a unique identifier for each termination assembly.

FIG. 9 shows how the arrangement of I/O modules and termination assemblies combine to allow a method for system self-discovery. A unique identifier for each IOM is globally unique across all IOM's. The TA identifier is unique only for each type of TA and each slot in that type.

Figure 10:
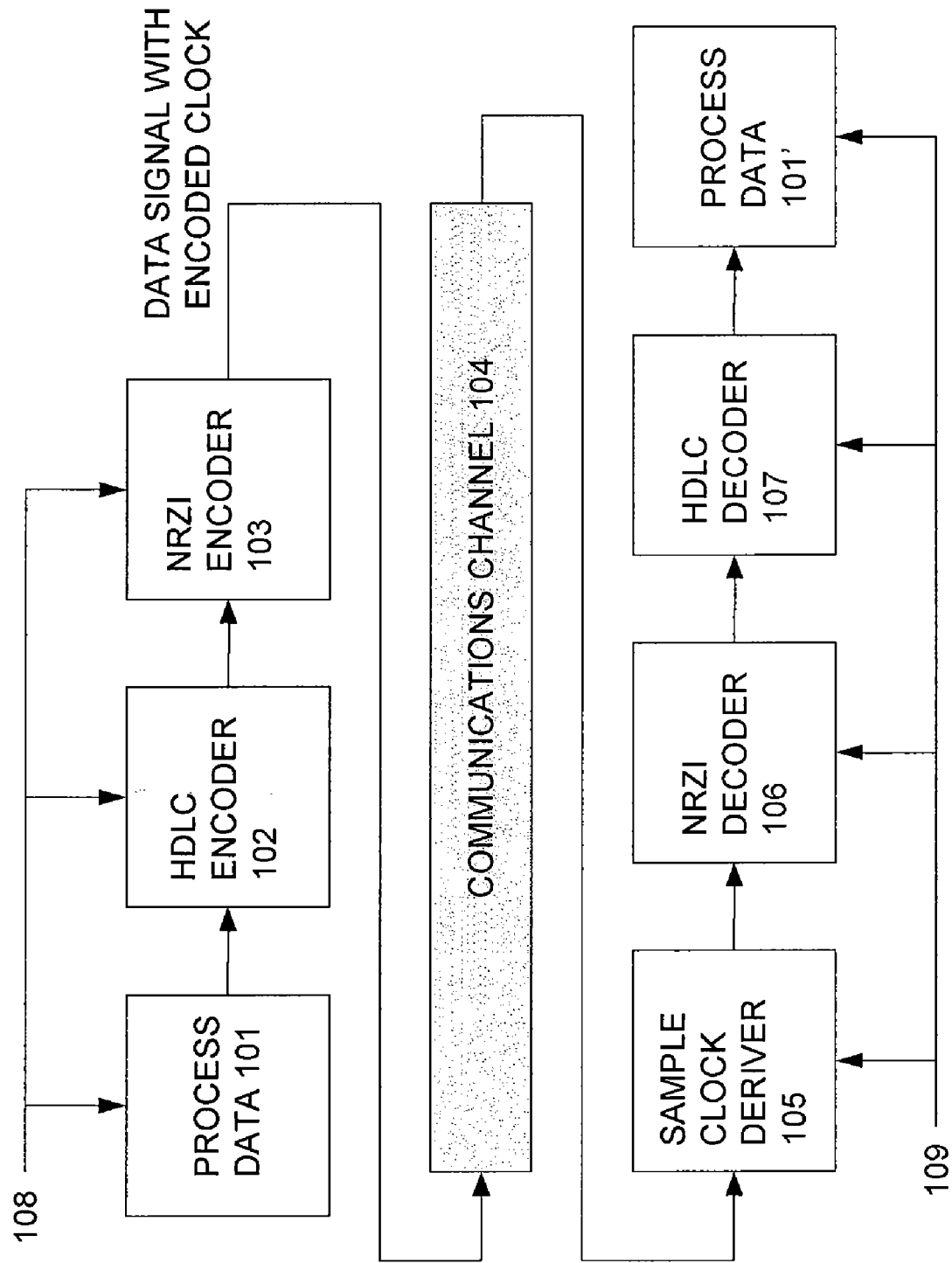
FIG. 10 illustrates coding of command and response messages.

FIG. 10 illustrates coding of signals for transmission between the processor modules and I/O modules.

In a preferred embodiment of the invention command and response communication protocols between the processors the I/O modules are implemented using a series of discrete message packets that are first encoded using a bit-oriented synchronous data link layer protocol High-Level Data Link Control (HDLC) for the purpose of message framing and link error detection. The packets are then coded using a non-return to zero inverted (NRZI) code so that bit cell transitions may be detected without the necessity for a discrete clock signal to be included along with the data signals.

Plain un-encoded process data 101 is first HDLC encoded by HDLC encoder 102, complete with framing flags and CRC characters. It is then NRZI encoded by NRZI encoder 103 to ensure that long strings of zeroes do not result in an absence of bit cell transitions. This allows the HDLC/NRZI encoded signal to be transmitted via communications channel 104 on a single wire.

Referring back to FIG. 7, command data is HDLC coded in the processor module 24*a*-24*c* and then NRZI encoded by the processor module interface 71*a*-71*c*, which is implemented in an FPGA in the preferred embodiment.

The command data is received and decoded by an I/O module interface 72*a*-72*e*, again implemented in an FPGA in the preferred embodiment. Response data is encoded and transmitted by the I/O module interface 72*a*-72*e*.

The response data is time division multiplexed back into each processor as it is received, without being converted out of HDLC format in the module interface 71*a*-71*c*. One benefit of this arrangement is that the hardware logic required is minimized due to the elimination of the requirement for data storage in the communications hardware path since the data streams directly through the hardware on the processor module side in both directions through the Processor Module interface 71*a*-71*c*.

Referring again to FIG. 10, at a receiver the incoming data is examined by sample clock deriver 105 for transitions and the optimum sample point is derived by maintaining a running estimation which predicts when the next bit cell will transition. Where applicable, the incoming receiver data is subsequently passed through an NRZI decoder 106 and an HDLC decoder 107 so as to be usable for the intended instruction. The input signal is sampled in the last third of the bit cell, adequately in advance of the next expected transition to ensure a reliable sample.

The same encoding scheme is used for data in both directions 108, 109, command and response, although the command and response data rates differ by a large factor. The bit rate of the response signals is individually low, allowing for their transmission as single ended signals. Since each I/O module has its own dedicated response line, the aggregate bandwidth of the response lines is matched to that of the command lines, i.e. response data only needs to be ¹⁄₂₄th of the command data rate, given, for example, 24 I/O modules.

The command signals are differentially encoded using a variant of low-voltage differential signalling (LVDS) and tightly coupled together using differential pairs so that externally induced noise disturbances will affect the voltage seen on both of the wires identically. This allows differential receivers in the I/O modules to reject spurious common mode artefacts, and only pass on the true, differential, signal that the differential transmitter encoded upon the pair of wires.

In the preferred embodiment, the direct current (DC) bias voltage is around 400 mV so that an unpowered module input retains a high impedance when it is plugged in, or experiences a power failure. The logic high output voltage (voltage out high or Voh) is below that which would be required to forward bias silicon junction protection diodes that are provided for each I/O module interface 72*a*-72*e*.

The command lines do not have a transmission line termination on the end of the line, to allow for live system backplane insertion. This is acceptable because the minimum command data bit cell time is greater than the reflection round-trip time for the un-terminated transmission line. Command line differential source drivers in the processor interface 71*a*-71*d* are terminated in the characteristic impedance of the transmission line to absorb the reflections from the open command line far ends.

Three special conditions are defined and are recognised by a receiver in either the IOMs or in the processor. These are:

Continuous '1's. This implies that the IOM or processor module is absent or un-powered.

Continuous '0's. This signifies the IOM is powered up but seriously faulted.

Continuous 0x7E (HDLC Idle flags). This implies the IOM or processor module is functional.

It will be appreciated that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable combination.

It is to be recognized that various alterations, modifications, and/or additions may be introduced into the constructions and arrangements of parts described above without departing from the scope of the present invention as defined in the appended claims.

The invention claimed is:

1. An industrial process control apparatus comprising:
a plurality of processors and a plurality of input/output modules in which:
each processor has a unidirectional command line which is connected to a plurality of input/output modules;
each input/output module has a unidirectional response line which is connected to a plurality of processors;
each processor being arranged in operation to issue an identifier request to all of the input/output modules, and in which each input/output module is arranged in operation to respond with a response comprising a unique identifier via its response line; such that each processor is able to identify the physical location of a respective input/output module having a particular unique identifier by identifying the response line upon which said response is received; and
each response from a respective input/output module including a termination adaptor identifier that is dependent upon a type of termination and a physical location of the respective input/output module relative to the termination adaptor identifier.

2. An industrial process control apparatus according to claim 1, in which the plurality of processors are connected together via interprocessor links.

3. An industrial process control apparatus according to claim 2, in which the interprocessor links provide point-to-point bidirectional links between each processor and each other processor.

4. An industrial process control apparatus according to claim 2, in which the interprocessor links communicate a broadcast signal which is received by each other processor.

5. An industrial process control apparatus according to claim 2, in which one or more processors are directly connected to a control network and each processor has access to another control network via one of said interprocessor links and another processor.

6. An industrial process control apparatus according to claim 1, in which each processor that is able to identify the physical location of the respective input/output module is arranged in operation to assign a logical slot number to each input/output module upon receiving said response and a logical group number to each of a plurality of said input/output modules.

7. An industrial process control apparatus according to claim 1, in which the processors are arranged in operation to send commands to the input/output modules using low voltage differential encoding on differential command line signal pairs.

8. An industrial process control apparatus according to claim 7, in which the differential command line signal pairs have no transmission line termination.

9. An industrial process control apparatus according to claim 1, in which the input/output modules are arranged in operation to send responses using single ended signals.

10. An industrial process control apparatus according to claim 1, in which, in operation signals are sent via the command lines and response lines using High-Level Data Link Control (HDLC) encoded frames of data which have been encoded using a non-return to zero inverted (NRZI) code.

11. An industrial process control apparatus according to claim 10, in which there are a plurality of predetermined data streams which are recognised by a receiver in at least one of each of the processors and the input/output modules, each of the plurality of predetermined data streams including one or more of:
continuous '1's that indicate that a respective module is absent or un-powered;
continuous '0's that indicate that a respective module is powered but faulted; and
continuous 0x7E that indicate that a respective module is functional.

12. An apparatus for controlling operation of an industrial process control comprising:
a plurality of processors;
a plurality of input/output modules that are associated with a termination adaptor identifier associated with at least one of a type of termination and a physical location of the respective input/output module;
a unidirectional command line connecting each of plurality of processors to each of the plurality of input/output modules;
a unidirectional response line connecting each input/output module to each of the plurality of processors; and
each input/output module associated with a termination adapter being configured to receive an identifier request from more than one of the plurality of processors and arranged to respond to the identifier request with a response that can include the respective termination adaptor identifier via its respective response line such that each respective processor is able to identify the physical location of a respective input/output module having a particular unique identifier and the redundancy of the input/output module by identifying the response line upon which said response is received.

13. The apparatus of claim 12 further comprising a link connecting each respective processor to the other processors.

14. The apparatus of claim 13, in which each link provides a point-to-point bidirectional connection between each processor and each other processor.

15. A method of configuring an industrial process control comprising:
connecting each of a number of processors to each of a number of signal modules with a unidirectional command line;
connecting each of the number of signal modules to each processor with a unidirectional response line;
connecting a termination assembly having a termination identity to each signal module;
assigning a logical slot number and a logical group number to each signal module upon receipt of a response on a respective unidirectional response line associated with each signal module; and
determining a redundancy and physical layout of the industrial process control based on the respective logical slot number, the respective logical group number, and the respective termination identity.

16. The method of claim 15 further comprising connecting each of the number of processors to each of the other processor.

17. The method of claim 15 wherein each processor assigns a logical slot number to each signal module upon receiving a response on a respective unidirectional response line.

18. The method of claim 17 wherein each processor sends commands to each signal module using low voltage differential encoding on differential command line signal pairs.

* * * * *